(12) United States Patent
Matsuo et al.

(10) Patent No.: US 8,603,599 B2
(45) Date of Patent: Dec. 10, 2013

(54) RESIN COMPOSITION FOR HOLLOW BLOW-MOLDED ARTICLE, HOLLOW BLOW-MOLDED ARTICLE, AND METHOD OF PRODUCING THE HOLLOW BLOW-MOLDED ARTICLE

(75) Inventors: Shingo Matsuo, Ichihara (JP); Toshio Hinokimori, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/698,911

(22) PCT Filed: May 24, 2011

(86) PCT No.: PCT/JP2011/061840
§ 371 (c)(1),
(2), (4) Date: Nov. 19, 2012

(87) PCT Pub. No.: WO2011/148929
PCT Pub. Date: Dec. 1, 2011

(65) Prior Publication Data
US 2013/0059976 A1    Mar. 7, 2013

(30) Foreign Application Priority Data

May 26, 2010    (JP) ................................. 2010-120764

(51) Int. Cl.
| | |
|---|---|
| *B29D 22/00* | (2006.01) |
| *B29C 49/04* | (2006.01) |
| *C08L 81/04* | (2006.01) |
| *C08K 5/54* | (2006.01) |
| *C08G 75/02* | (2006.01) |

(52) U.S. Cl.
USPC .......... 428/35.7; 264/523; 524/502; 525/106; 525/189; 525/537; 528/388

(58) Field of Classification Search
USPC ........... 525/106, 189, 537; 528/388; 524/502; 264/523, 331.12; 428/35.7
See application file for complete search history.

(56) References Cited

U.S. PATENT DOCUMENTS

| | | | |
|---|---|---|---|
| 5,350,833 A | 9/1994 | Inoue et al. | |
| 5,367,049 A | * 11/1994 | Van Hoyweghen et al. | .. 528/388 |

FOREIGN PATENT DOCUMENTS

| | | | |
|---|---|---|---|
| CA | 2011683 | * | 10/1994 |
| JP | 3-236930 A | | 10/1991 |
| JP | 3-247436 A | | 11/1991 |
| JP | 4-145127 A | | 5/1992 |
| JP | 5-032896 A | | 2/1993 |
| JP | 5-162190 A | | 6/1993 |
| JP | 8-231723 A | | 9/1996 |
| JP | 8-333512 A | | 12/1996 |
| JP | 2006-219665 A | | 8/2006 |
| JP | 2008-075055 A | | 4/2008 |
| JP | 2008-247955 A | | 10/2008 |

OTHER PUBLICATIONS

Caplus Abstract of JP 03236930; pub. date: Oct. 1991.*
Machine Translation of JP 2008-247955; pub. date: Oct. 2008.*
International Search Report for PCT/JP2011/061840, mailing date of Jul. 26, 2011.
Notice of Allowance for JP2011-547103, mailing date of Jan. 25, 2012.

* cited by examiner

*Primary Examiner* — Fred M Teskin
(74) *Attorney, Agent, or Firm* — Westerman, Hattori, Daniels & Adrian, LLP

(57) ABSTRACT

There are provided, according to the present invention, a resin composition for hollow blow-molded article which is obtained in a high productivity on an industrial scale with excellent moldability and drawdown resistance, and the production method thereof, by melting and mixing a polyarylene sulfide resin including a terminal carboxyl group within the resin in an amount of 25 to 45 (μmol/g), and having a non-Newtonian index of 0.90 to 1.15 and also a melt viscosity as measured at 300° C. within the range of 1,000 poise to 3,000 poise and an epoxy group-containing polyolefin so that the proportion of the epoxy group-containing polyolefin is 5 to 30 parts by mass with respect to 100 parts by mass of the polyarylene sulfide resin; and a hollow blow-molded article with excellent mechanical strength, such as the heat resistance and impact resistance, and surface appearance, and the production method thereof.

32 Claims, No Drawings

RESIN COMPOSITION FOR HOLLOW BLOW-MOLDED ARTICLE, HOLLOW BLOW-MOLDED ARTICLE, AND METHOD OF PRODUCING THE HOLLOW BLOW-MOLDED ARTICLE

BACKGROUND OF THE INVENTION

1. Field of the Invention

The present invention relates to a hollow blow-molded article and a material for the molded article.

2. Description of Related Art

In recent years, a method of producing ducts in the engine room as automobile components by hollow blow molding has become popular, and currently, polyamide-based materials have been mainly used. However, because the heat resistance of polyamide-based materials is unsatisfactory, materials for hollow blow molding which exhibit high heat resistance as well as chemical resistance and impact resistance have been required.

On the other hand, polyarylene sulfide resins (hereinafter, referred to as PAS resins) are engineering plastics with excellent heat resistance, chemical resistance, flame retardancy, electrical characteristics, and the like, and there are growing demands for their applications such as electric and electronic parts, automobile parts and precision machinery parts.

Although various attempts have been conventionally made to use materials for hollow blow molding which employ PAS resins, because the PAS resins exhibit a very high melt fluidity when molded, in the case of using a typical extrusion blow molding method (i.e., a method in which a parison is extruded and then blow molded), the degree of drawdown of the parison is very high, which makes it extremely difficult to be molded into a container with less uneven thickness. For this reason, the current situation is that the method has been limited to the injection molding method in most cases, and most of the molded articles of PPS resins is small and has not been much applied to large parts such as bottles and tanks through, for example, blow molding.

As an example of application of PAS resins to the blow molding process, a resin composition obtained by melting and kneading a PAS resin and an epoxy group-containing olefin-based copolymer has been known (Patent Document 1). However, although this PAS resin exhibited high melt viscosity, the proportion of the terminal carboxyl groups was high, and the PAS resin contained a large amount of low molecular weight components. Because of this, not only there is room for improvements in moldability of the composition in terms of the drawdown resistance and uneven thickness when carrying out a hollow blow molding process, but also there is room for improvements in mechanical strength, especially thermal shock resistance, because the proportion of reaction products between the low molecular weight components in the PAS resins and the epoxy group-containing olefin-based copolymers is increased. Accordingly, the use thereof in more severe environments, for example, around the automobile engine, has not been accomplished.

Patent Document 1: Japanese Unexamined Patent Application, First Publication No. Hei 3-236930

SUMMARY OF THE INVENTION

Therefore, an object to be achieved by the present invention is to provide, by using a polyarylene sulfide resin, a hollow blow-molded article with excellent mechanical strength, especially thermal shock resistance; and a resin composition for hollow blow-molded articles exhibiting excellent moldability, as well as the production method thereof.

The inventors of the present invention have conducted intensive and extensive studies in order to solve the above problems and discovered the following, as a result, which has led to the completion of the present invention: that is, a hollow blow-molded article with excellent mechanical strength, such as the thermal shock resistance, and a polyarylene sulfide resin composition for hollow blow-molded articles exhibiting excellent moldability for providing the hollow blow-molded article, as well as the production method thereof, can be achieved by combining a polyarylene sulfide resin having a specific terminal carboxyl group with an epoxy group-containing olefin-based copolymer. In other words, the present invention relates to a method of producing a resin composition for hollow blow-molded article characterized by melting and mixing a polyarylene sulfide resin (A) including a terminal carboxyl group within the resin in an amount of 25 to 45 ($\mu$mol/g), and having a non-Newtonian index of 0.90 to 1.15 and also a melt viscosity as measured at 300° C. within the range of 1,000 poise to 3,000 poise and an epoxy group-containing polyolefin (B) so that the proportion of the epoxy group-containing polyolefin (B) is 5 to 30 parts by mass with respect to 100 parts by mass of the polyarylene sulfide resin (A).

In addition, the present invention relates to a resin composition for hollow blow-molded article obtained by melting and mixing a polyarylene sulfide resin (A) including a terminal carboxyl group in an amount of 25 to 45 ($\mu$mol/g) within the resin, and having a non-Newtonian index of 0.90 to 1.15 and also a melt viscosity as measured at 300° C. within the range of 1,000 poise to 3,000 poise and an epoxy group-containing polyolefin (B) so that the proportion of the epoxy group-containing polyolefin (B) is 5 to 30 parts by mass with respect to 100 parts by mass of the polyarylene sulfide resin (A).

In addition, the present invention relates to a resin composition for hollow blow-molded article obtained by melting and mixing a polyarylene sulfide resin (A) including a terminal carboxyl group in an amount of 25 to 45 ($\mu$mol/g) within the resin, and having a non-Newtonian index of 0.90 to 1.15 and also a melt viscosity as measured at 300° C. within the range of 1,000 poise to 3,000 poise and an epoxy group-containing polyolefin (B) so that the proportion of the epoxy group-containing polyolefin (B) is 5 to 30 parts by mass with respect to 100 parts by mass of the polyarylene sulfide resin (A).

Further, the present invention relates to a hollow blow-molded article characterized by being obtained by hollow blow-molding the aforementioned resin composition for hollow blow-molded article.

Moreover, the present invention relates to a method of producing a hollow blow-molded article characterized by hollow blow-molding the aforementioned resin composition for hollow blow-molded article.

According to the present invention, by using polyarylene sulfide, a hollow blow-molded article with excellent mechanical strength, such as the thermal shock resistance; a resin composition for hollow blow-molded articles exhibiting excellent moldability for providing the hollow blow-molded article; and the production method thereof can be provided.

DETAILED DESCRIPTION OF THE INVENTION

The method of producing a resin composition for hollow blow-molded article according to the present invention is characterized by melting and mixing a polyarylene sulfide resin (A) including a terminal carboxyl group within the resin in an amount of 25 to 45 (μmol/g), and having a non-Newtonian index of 0.90 to 1.15 and also a melt viscosity as measured at 300° C. within the range of 1,000 poise to 3,000 poise and an epoxy group-containing polyolefin (B) so that the proportion of the epoxy group-containing polyolefin (13) is 5 to 30 parts by mass with respect to 100 parts by mass of the polyarylene sulfide resin (A).

The polyarylene sulfide resin (A) used in the present invention contains a carboxyl group at the terminal within the resin in an amount of 25 to 45 (μmol/g). When the amount of terminal carboxyl group is less than 25 (μmol/g), the reactivity with the polyolefin (B) becomes unsatisfactory, and the intended effects including the mechanical strength such as the thermal shock resistance cannot be achieved. On the other hand, when the amount of terminal carboxyl group exceeds 45 (μmol/g), the reactivity with the polyolefin becomes excessive, gelation easily occurs during the melting and kneading process, and the melt viscosity also becomes excessive, as a result of which the extrusion stability of the parison is reduced, and it becomes difficult to obtain a uniform molded article without causing uneven thickness.

In addition, for the polyarylene sulfide resin (A), a resin having a melt viscosity within a range that is suitable for blow molding is used, and it is usually preferable to use a high molecular weight resin having a melt viscosity, as measured at 300° C. and a shear rate of 10 sec$^{-1}$, within the range from 1,000 poise to 3,000 poise, and more preferably from 1,500 poise to 3,000 poise. When the melt viscosity is less than 1,000 poise, the drawdown is likely to occur. On the other hand, when the melt viscosity exceeds 3,000 poise, the extrusion stability of the parison is reduced, and it becomes difficult to obtain a uniform molded article without causing uneven thickness.

Moreover, the polyarylene sulfide resin (A) has a non-Newtonian index within a range of 0.90 to 1.15, and has a so-called linear type structure. When the non-Newtonian index exceeds 1.15, the degree of branching increases, making it impossible to adjust the proportion of the terminal carboxyl group within an appropriate range.

With respect to the polyarylene sulfide resin used in the present invention as described above, not only the PAS resin itself has a high melt viscosity which is suitable for hollow blow molding, but also the straight chain structure therein has, among the linear type structures, a low degree of branching with a non-Newtonian index of 0.90 to 1.15. As a result, the proportion of terminal carboxyl group can be suppressed, the reaction with the polyolefin (B) and a subsequent excessive increase in the melt viscosity of the melted and kneaded mixture can be prevented, excellent moldability can be achieved without causing uneven thickness, and the mechanical strength, especially the thermal shock resistance of the hollow blow-molded article can be improved. Furthermore, it is preferable to use the resin (A) in which the proportion of alkali metal salts within the resin is not more than 20 μmol/g since the compatibility with the polyolefin (B) is improved, and the moldability and thermal shock resistance are further improved.

The polyarylene sulfide resin (A) used in the present invention can be prepared, for example, by the following method. That is, it can be obtained by reacting a polyhaloaromatic compound (a), an alkali metal hydrosulfide (b) and an organic acid alkali metal salt (c) in the presence of a solid alkali metal sulfide and an aprotic polar organic solvent, so that the aforementioned organic acid alkali metal salt (c) is used in an amount of 0.01 moles or more and less than 0.9 moles, relative to 1 mole of the combined total of the aforementioned solid alkali metal sulfide and alkali metal hydrosulfide (b), and also the amount of water present in the reaction system is not more than 0.02 moles relative to 1 mole of the aforementioned aprotic polar organic solvent to produce a crude polyarylene sulfide resin, followed by a deionization treatment.

As described above, when reacting a polyhaloaromatic compound (a), an alkali metal hydrosulfide (b) and an organic acid alkali metal salt (c) in the presence of a solid alkali metal sulfide and an aprotic polar organic solvent, by controlling the amount of the aforementioned organic acid alkali metal salt (c) relative to the amount of sulfur atoms present in the reaction system, that is, by controlling the amount of the aforementioned organic acid alkali metal salt (c) so that the amount of the metal salt (c) is at least 0.01 moles and less than 0.9 moles relative to 1 mole of the combined total of the aforementioned solid alkali metal sulfide and alkali metal hydrosulfide (b), and also by carrying out a heterogeneous reaction using a sulfidizing agent as a solid content by allowing the reaction to proceed while the amount of water in the reaction system is reduced as much as possible, the side reaction is suppressed, and the molecular weight of the polyarylene sulfide resin (A) can be increased. It should be noted that the expression "amount of water present in the reaction system" refers to the total amount of water actually present in the reaction system in the form of crystal water, $H_2O$, and the like, among the total amount of water present in the reaction system.

As described above, the amount of the organic acid alkali metal salt (c) present in the reaction system is at least 0.01 moles and less than 0.9 moles, relative to 1 mole of the sulfur atoms present in the reaction system, and is particularly preferably within the range of 0.04 to 0.4 moles from the viewpoint that the effect of suppressing side reactions becomes significant.

Here, specific examples of the organic acid alkali metal salt (c) include alkali metal salts of a lower fatty acid such as formic acid, acetic acid, or propionic acid; alkali metal salts of an aminocarboxylic acid such as glycine, alanine, glutamic acid, or 4-aminobutyric acid; and alkali metal salts of hydrolysates of aliphatic cyclic compounds which may be ring-opened by hydrolysis, including aliphatic cyclic amide compounds, such as N-methyl-2-pyrrolidone (hereinafter abbreviated as "NMP"), N-cyclohexyl-2-pyrrolidone, 2-pyrrolidone, 1,3-dimethyl-2-imidazolidinone, 8-caprolactam, and N-methyl-ε-caprolactam, and sulfolanes, such as sulfolane and dimethylsulfolane. In addition, examples of the alkali metal salt include a lithium salt, a sodium salt, a potassium salt, a rubidium salt, and a cesium salt or the like. It is preferable that the organic acid alkali metal salt (c) be used in the form of a liquid in the reaction system.

Further, among these organic acid alkali metal salts (c) described above, an alkali metal salt (c2) of a hydrolysate of an aliphatic cyclic compound (c1) is preferable from the viewpoint of satisfactory reactivity, and an alkali metal salt of a ring-opened product of an aliphatic cyclic amide compound, particularly an alkali metal salt of a hydrolysate of N-methyl-2-pyrrolidone is preferable in terms of reactivity. In addition, these alkali metal salts are preferably used as a lithium salt or a sodium salt, and particularly preferably as a sodium salt.

Examples of the aprotic polar organic solvent include amides, ureas, and lactams such as NMP, N-cyclohexyl-2-pyrrolidone, N-methyl-ε-caprolactam, formamide, acetamide, N-methylformamide, N,N-dimethylacetamide, 2-pyrrolidone, 8-caprolactam, hexamethylphosphoramide, tetramethylurea, N,N-dimethylpropyleneurea, 1,3-dimethyl-2-imidazolidinone; sulfolanes such as sulfolane and dimethylsulfolane; nitriles such as benzonitrile; ketones such as methyl phenyl ketone; and mixtures thereof. Among these aprotic polar organic solvents, NMP is particularly preferable from the viewpoint of improving reactivity of a sulfidizing agent.

In the method of producing the polyarylene sulfide resin (A) used in the present invention, it is necessary to reduce the amount of water present in the reaction system as much as possible, specifically, to 0.02 moles or less, relative to 1 mole of the aprotic polar organic solvent. More specifically, examples of the production process include a method which undergoes the following steps 1 to 4.

The method is characterized by including, as essential production steps,

Step 1: a step of producing a slurry (I) containing a solid alkali metal sulfide by reacting an aliphatic cyclic compound (c1) that may be ring-opened by hydrolysis with a hydrous alkali metal sulfide or with a hydrous alkali metal hydrosulfide and an alkali metal hydroxide, while conducting a dehydration process in the presence of a non-hydrolyzable organic solvent;

Step 2: a step of further adding an aprotic polar organic solvent after the production of the slurry (I), and removing water by distillation to conduct a dehydration process;

Step 3: a subsequent step of conducting polymerization by allowing a polyhaloaromatic compound (a), an alkali metal hydrosulfide (b), and an alkali metal salt (c2) of a hydrolysate of the compound (c1) to react with each other in the slurry (I) obtained through the dehydration step of step 2 in a state where the amount of water present in the reaction system is 0.02 moles or less relative to 1 mole of the aprotic polar organic solvent; and Step 4: a step of subjecting the polymerized substance (a crude polyarylene sulfide resin) obtained in step 3 to a deionization treatment.

The above steps 1 to 4 will be described in detail below.

Step 1 is a step of producing a slurry (I) by allowing a hydrous alkali metal sulfide to react with an aliphatic cyclic compound (c1) that may be ring-opened by hydrolysis, and a non-hydrolyzable organic solvent while conducting a dehydration process; or a hydrous alkali metal hydrosulfide and an alkali metal hydroxide to react with an aliphatic cyclic compound (c1) that may be ring-opened by hydrolysis, and a non-hydrolyzable organic solvent while conducting a dehydration process.

Thus, step 1 is a step of forming a slurry (I) in which a solid alkali metal sulfide is dispersed in a non-hydrolyzable organic solvent by allowing a hydrous alkali metal sulfide and an aliphatic cyclic compound (c1) that may be ring-opened by hydrolysis to react with each other while conducting a dehydration process in the presence of the non-hydrolyzable organic solvent; or a step of forming a slurry (I) in which a solid alkali metal sulfide is dispersed in a non-hydrolyzable organic solvent by allowing a hydrous alkali metal hydrosulfide, an alkali metal hydroxide and an aliphatic cyclic compound (c1) that may be ring-opened by hydrolysis to react with each other while conducting a dehydration process in the presence of the non-hydrolyzable organic solvent. In the slurry (I), an alkali metal hydrosulfide (b) and an alkali metal salt (c2) of a hydrolysate of the compound (c1) coexist.

Examples of the hydrous alkali metal sulfide used herein include liquid or solid hydrates of compounds such as lithium sulfide, sodium sulfide, potassium sulfide, rubidium sulfide and cesium sulfide. The solid content thereof is preferably 10 to 80% by mass, and particularly preferably 35 to 65% by mass.

Among these, hydrates of sodium sulfide are preferable from the viewpoint of reactivity. It should be noted that when the hydrous alkali metal sulfide is used as a sulfur source, it is preferable to further add an alkali metal hydroxide in addition to the hydrous alkali metal sulfide and to conduct a dehydration treatment from the viewpoint of further promoting the production of the solid alkali metal sulfide.

On the other hand, examples of the hydrous alkali metal hydrosulfide include liquid or solid hydrates of compounds such as lithium hydrosulfide, sodium hydrosulfide, potassium hydrosulfide, rubidium hydrosulfide and cesium hydrosulfide, and the solid content thereof is preferably 10 to 80% by mass. Among these, hydrates of lithium hydrosulfide and hydrates of sodium hydrosulfide are preferable, and hydrates of sodium hydrosulfide are particularly preferable.

In addition, examples of the alkali metal hydroxide include lithium hydroxide, sodium hydroxide, potassium hydroxide, rubidium hydroxide, cesium hydroxide, and aqueous solutions thereof. It should be noted that when the aqueous solution is used, an aqueous solution having a concentration of 20% by mass or more is preferable from the viewpoint of the ease of the dehydration treatment in step 1. Among these, lithium hydroxide, sodium hydroxide and potassium hydroxide are preferable, and sodium hydroxide is particularly preferable. The amount of alkali metal hydroxide used is preferably within the range of 0.8 to 1.2 moles, and particularly preferably within the range of 0.9 to 1.1 moles per mole of the alkali metal hydrosulfide (b) from the viewpoint of promoting the production of the solid alkali metal sulfide.

More specifically, examples of the method for conducting the dehydration treatment in step 1 include the following methods.

Method 1-A

A method includes charging predetermined amounts of an aliphatic cyclic compound (c1) that may be ring-opened by hydrolysis, a non-hydrolyzable organic solvent, a hydrous alkali metal sulfide, and if necessary, the alkali metal hydrosulfide or the alkali metal hydroxide in a reaction vessel; and dehydrating by heating the resulting mixture to a temperature which is equal to or higher than the boiling point of the hydrous alkali metal sulfide and also enables removal of water through azeotropy, specifically, within the range of 80 to 220° C., and preferably within the range of 100 to 200° C.

Method 1-B

A method includes charging predetermined amounts of an aliphatic cyclic compound (c1) that may be ring-opened by hydrolysis, a non-hydrolyzable organic solvent, a hydrous alkali metal hydrosulfide, and an alkali metal hydroxide in a reaction vessel; producing a hydrous alkali metal sulfide substantially simultaneously with this charging; and then dehydrating by heating the reaction solution to a temperature which is equal to or higher than the boiling point of the hydrous alkali metal sulfide and also enables removal of water through azeotropy, specifically, within the range of 80 to 220° C., and preferably within the range of 100 to 200° C.

In the above-mentioned methods 1-A and 1-B, water and a non-hydrolyzable organic solvent, which have been removed by azeotropic distillation, are separated by a decanter, and then only the non-hydrolyzable organic solvent may be returned to the reaction system, or the non-hydrolyzable organic solvent may be additionally charged in an amount equivalent to the amount removed by azeotropic distillation, or the non-hydrolyzable organic solvent may be excessively charged in advance in an amount equal to or more than that removed by azeotropic distillation. In the present invention, the method 1-B is particularly preferable from the viewpoint that the slurry is easily prepared and significant effects of the present invention can be achieved.

In addition, at the initial stage of the dehydration, the reaction system is composed of two layers of an organic layer and an aqueous layer. However, as the dehydration proceeds, an anhydrous alkali metal sulfide is precipitated in the form of fine particles and is uniformly dispersed in the non-hydrolyzable organic solvent. Furthermore, the dehydration treatment is continuously performed until almost all the aliphatic cyclic compound (c1) that may be ring-opened by hydrolysis in the reaction system is hydrolyzed.

Thus, step 1 of the present invention is a step in which water is discharged to the outside of the reaction system by a dehydration treatment, while the aliphatic cyclic compound (c1) that may be ring-opened by hydrolysis is hydrolyzed, and an anhydrous solid alkali metal sulfide is precipitated at the same time. Therefore, when an excessive amount of water is present in the reaction system after the dehydration treatment, a large amount of byproducts are produced in a subsequent polymerization step to induce a growing end terminating reaction, and thus the production of the targeted crude polyarylene sulfide resin having a higher molecular weight tends to be inhibited.

Therefore, it is preferable that the total amount of water in the reaction system after the dehydration treatment in step 1 is as low as possible. More specifically, the amount of water is preferably more than 0.1 moles and equal to or less than 0.99 moles, and more preferably 0.6 to 0.96 moles per mole of the hydrous alkali metal sulfide (method 1-A) or the hydrous alkali metal hydrosulfide (method 1-B) used in step 1, i.e., per mole of sulfur atoms in the reaction system. Here, the expression "total amount of water in the reaction system" refers to a total mass of water consumed in the hydrolysis of the compound (c1), a trace amount of crystal water remaining in the solid alkali metal sulfide, and all other water components present in the reaction system.

Furthermore, with regard to the amount of water in the reaction system after the dehydration treatment in step 1, the total amount of water is preferably within the range of more than 0.1 moles and equal to or less than 0.99 moles, and particularly preferably within the range of 0.6 to 0.96 moles per mole of sulfur atoms in the reaction system described above, and the amount of water present in the reaction system is preferably 0.03 to 0.11 moles per mole of sulfur atoms in the reaction system. Here, the expression "amount of water present in the reaction system" refers to, among the total amount of water present in the reaction system, the total amount of water except for the water consumed in the hydrolysis of the compound (c1), that is, the total amount of water actually present in the reaction system in the form of crystal water, $H_2O$, and the like (hereinafter, these are referred to as "crystal water and the like").

Here, the reaction in step 1 can be represented by, for example, formula (1) shown below. In other words, step 1 is a step of removing water produced as a byproduct during production of the solid alkali metal sulfide to the outside of the reaction system, while hydrolyzing the aliphatic cyclic compound (c1) and forming an alkali metal hydrosulfide (b) at the same time.

Step 1: Dehydration Reaction

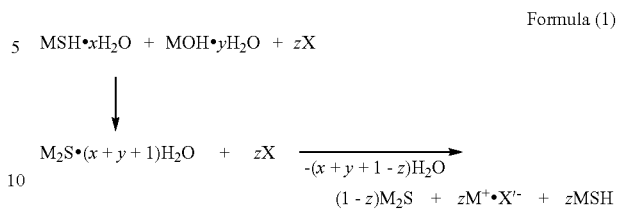

Formula (1)

In the above formula (1), x and y represent numbers that satisfy an equation of (x+y)=0.1 to 30, z represents a number of 0.01 or more and less than 0.9, M represents an alkali metal atom, X represents the compound (c1) and X' represents the hydrolysate thereof.

In step 1, by adjusting the amount of the aliphatic cyclic compound (c1) charged, it is possible to adjust the amount of alkali metal sulfide, which is a solid component in the reaction system, and the amount of alkali metal hydrosulfide (b). The present invention is characterized by allowing the alkali metal sulfide to be present as a solid component in the form of a slurry; and then, allowing residual crystal water to be extracted in the solution by further adding an aprotic polar organic solvent in step 2 to conduct a dehydration treatment; and then, performing a heterogeneous reaction in the slurry state in step 3, thereby reducing the amount of the alkali metal salts of the hydrolysates of the aliphatic cyclic compound (c1), suppressing side reactions during polymerization of the crude polyarylene sulfide resin, and enabling the molecular weight to be increased. Therefore, the amount of the aliphatic cyclic compound (c1) charged in step 1 is preferably 0.01 moles or more and less than 0.9 moles per mole of the hydrous alkali metal sulfide (method 1-A) or the hydrous alkali metal hydrosulfide (method 1-B). In particular, the aliphatic cyclic compound (c1) is preferably used in an amount of 0.04 to 0.4 moles per mole of the hydrous alkali metal sulfide (method 1-A) or the hydrous alkali metal hydrosulfide (method 1-B) from the viewpoint that the above effects become significant.

Here, as the aprotic polar organic solvent used in step 2, the same aprotic polar organic solvents as those described above can be used.

In addition, examples of the alkali metal salts of a hydrolysate of the aliphatic cyclic compound (c1) include a lithium salt, a sodium salt, a potassium salt, a rubidium salt, and a cesium salt of a hydrolysate of the aliphatic cyclic compound (c1). These organic acid alkali metal salts (c) are preferably in a liquid form in the reaction system.

Further, among these organic acid alkali metal salts (c) described above, an alkali metal salt (c2) of a hydrolysate of the aliphatic cyclic compound (c1) is preferable from the viewpoint of satisfactory reactivity, and an alkali metal salt of a ring-opened product of an aliphatic cyclic amide compound, in particular, an alkali metal salt of a hydrolysate of NMP is preferable from the viewpoint of reactivity. In addition, these alkali metal salts are preferably used as a lithium salt or a sodium ion salt.

Further, the non-hydrolyzable organic solvent used in step 1 may be any organic solvent as long as the organic solvent is inert to water, as described above. For example, general-purpose aliphatic hydrocarbons, aromatic hydrocarbons, and the like can be used. However, in the present invention, the polyhaloaromatic compound (a), which is subjected to the reaction in step 3, is particularly preferably used as the organic solvent from the viewpoint that the reaction and polymerization in subsequent step 3 are satisfactorily conducted, and thus production efficiency can be markedly improved.

Examples of the polyhaloaromatic compound (a) used herein include p-dihalobenzenes, m-dihalobenzenes, o-dihalobenzenes, 1,2,3-trihalobenzenes, 1,2,4-trihalobenzenes, 1,3,5-trihalobenzenes, 1,2,3,5-tetrahalobenzenes, 1,2,4,5-tetrahalobenzenes, 1,4,6-trihalonaphthalenes, 2,5-dihalotoluenes, 1,4-dihalonaphthalenes, 1-methoxy-2,5-dihalobenzenes, 4,4'-dihalobiphenyls, 3,5-dihalobenzoic acids, 2,4-dihalobenzoic acids, 2,5-dihalonitrobenzenes, 2,4-dihalonitrobenzenes, 2,4-dihaloanisoles, p,p'-dihalodiphenyl ethers, 4,4'-dihalobenzophenones, 4,4'-dihalodiphenylsulfones, 4,4'-dihalodiphenyl sulfoxides, 4,4'-dihalodiphenyl sulfides, and compounds having an alkyl group of 1 to 18 carbon atoms as a nuclear substituent on the aromatic ring of any of the above compounds. In addition, the halogen atom contained in each of the above compounds is preferably a chlorine atom or a bromine atom.

Among the above polyhaloaromatic compounds (a), bifunctional dihaloaromatic compounds are preferable from the viewpoint that a linear, high-molecular-weight crude polyarylene sulfide resin can be efficiently produced in the present invention. Among these, p-dichlorobenzene, m-dichlorobenzene, 4,4'-dichlorobenzophenone and 4,4'-dichlorodiphenylsulfone are preferable from the viewpoint that the polyarylene sulfide resin (A) ultimately obtained has improved mechanical strength and moldability, and p-dichlorobenzene is particularly preferable. In addition, when it is desired to produce a linear PAS resin with a polymer structure having a partially branched structure, it is preferable to partially use a 1,2,3-trihalobenzene, 1,2,4-trihalobenzene, or 1,3,5-trihalobenzene in combination with the above dihaloaromatic compound.

The amount of non-hydrolyzable organic solvent used is not particularly limited, but is preferably determined so that fluidity of the slurry (I) obtained in step 1 is satisfactory. In addition, when the polyhaloaromatic compound (a) is used as the non-hydrolyzable organic solvent, the amount of non-hydrolyzable organic solvent is preferably within the range of 0.2 to 5.0 moles, and particularly preferably within the range of 0.3 to 2.0 moles per mole of the hydrous alkali metal sulfide (method 1-A) or the hydrous alkali metal hydrosulfide (method 1-B) from the viewpoint that the reactivity and polymerizability in step 2 are excellent. The polyhaloaromatic compound (a) may be used directly as it is in the subsequent step for producing the PAS resin, may be added as necessary in the subsequent step for producing the crude polyarylene sulfide resin when the amount is insufficient, and may be removed when the amount is excessive.

Alternatively, it is also possible to obtain a copolymer containing two or more types of different reaction units by selecting an appropriate combination of the polyhaloaromatic compounds (a). For example, it is particularly preferable to use p-dichlorobenzene and 4,4'-dichlorobenzophenone or 4,4'-dichlorodiphenylsulfone in combination because a polyarylene sulfide exhibiting excellent heat resistance can be obtained.

Next, step 2 is a step of further adding an aprotic polar organic solvent to the slurry (I) obtained in step 1, and distilling off water to conduct dehydration until the amount of water present in the reaction system is reduced to 0.02 moles or less relative to 1 mole of the aprotic polar organic solvent present in the reaction system at the start of step 3. The water distilled of in step 2 is crystal water and the like that have not been completely removed in step 1. In addition, as described above, "the amount of water present in the reaction system" refers to the amount of crystal water and the like that are actually present in the reaction system. As described above, at the time of the completion of step 1, crystal water and the like are usually contained in the slurry (I) in an amount of 0.03 to 0.11 moles per mole of sulfur atoms in the reaction system. The dehydration step of step 2 is performed in order to reduce the content of crystal water and the like in the reaction system as much as possible.

If water such as crystal water is present in the reaction system in step 3, the solid alkali metal sulfide dissociates into an alkali metal hydrosulfide and an alkali metal hydroxide, resulting in a problem of inducing a terminating reaction of the growing end of phenol which is caused by a side reaction between the alkali metal hydroxide and the polyhaloaromatic compound (a) or a side reaction between the alkali metal hydroxide and a halogen of a polymer terminal group (refer to formula (2) shown below). In addition, in step 2, when the aliphatic cyclic compound (c1) that may be ring-opened by hydrolysis is additionally added as the aprotic polar organic solvent, although a hydrolysis reaction of the aliphatic cyclic compound (c1) also occurs in parallel by the water present in the reaction system, the above terminating reaction of the growing end of phenol, which is a competitive reaction, preferentially occurs. As a result, the production of the targeted crude polyarylene sulfide resin having a higher molecular weight tends to be inhibited.

Formula (2)

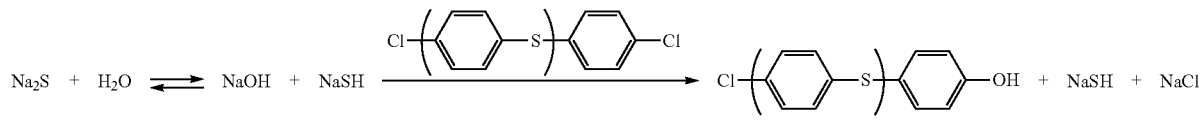

In the present invention, by adding an aprotic polar organic solvent in step 2, the crystal water that is not completely removed by dehydration in step 1 and remains in the reaction system is extracted in the solution, and the crystal water and the like can be reduced as much as possible by the subsequent dehydration treatment. A reaction is conducted in a state where the amount of water present in the reaction system at the start of step 3 is 0.02 moles or less relative to 1 mole of the aprotic polar organic solvent present in the reaction system, thereby suppressing a terminating reaction of the growing end of phenol which is caused by a side reaction between an alkali metal hydroxide and the polyhaloaromatic compound (a) or a side reaction between an alkali metal hydroxide and a halogen of a polymer terminal group and obtaining a high molecular weight resin.

More specifically, the dehydration treatment in step 2 is performed as follows. After the slurry (I) is formed in step 1, more preferably, after the amount of crystal water and the like present in the slurry (I) becomes 0.03 to 0.11 moles per mole of sulfur atoms in the reaction system, as step 2, an aprotic polar organic solvent is added into the reaction system and dehydration is conducted. In this step, the amount of aprotic polar organic solvent added is preferably in a ratio of 0.5 to 5 moles relative to 1 mole of sulfur atoms present in the reaction system from the viewpoint that the residual crystal water and the like can be efficiently extracted in the solution by adding the aprotic polar organic solvent. The dehydration treatment in step 2 is usually conducted under the conditions of a temperature of 180 to 220° C. and a gauge pressure of 0.0 to 0.1 MPa, and particularly preferably under the conditions of a temperature of 180 to 200° C. and a gauge pressure of 0.0 to 0.05 MPa from the viewpoint that the dehydration efficiency is excellent and also the occurrence of side reactions that inhibit polymerization can be suppressed. More specifically, a method is employed in which a mixture of an aprotic polar organic solvent and water is isolated by distillation under the above temperature and pressure conditions, this mixed vapor is condensed by a condenser and separated by a decanter or the like, and the polyhaloaromatic compound (a) removed by azeotropic distillation is returned into the reaction system. Here, the amount of water present in the reaction system at the start of step 3 is 0.02 moles or less relative to 1 mole of the aprotic polar organic solvent in the reaction system, and is also less than 0.02 mole, preferably 0.01 mole or less, relative to 1 mole of sulfur atoms present in the reaction system. When the amount of water exceeds this ratio, byproducts which inhibit polymerization in the reaction/polymerization step in step 3 are produced. More specifically, from this point of view, the amount of water present in the reaction system at the start of step 3 is preferably 0.02 moles or less relative to 1 mole of the aprotic polar organic solvent in the reaction system.

It should be noted that the above-mentioned aprotic polar organic solvents can be used as the aprotic polar organic solvent added in step 2. Among these, NMP is particularly preferable.

Next, step 3 in the present invention is a step of conducting polymerization by allowing a polyhaloaromatic compound (a), an alkali metal hydrosulfide (b), and an alkali metal salt (c2) of a hydrolysate of the compound (c1) to react with each other in the slurry (I) obtained through the dehydration step of step 2 (refer to formula (3) shown below).

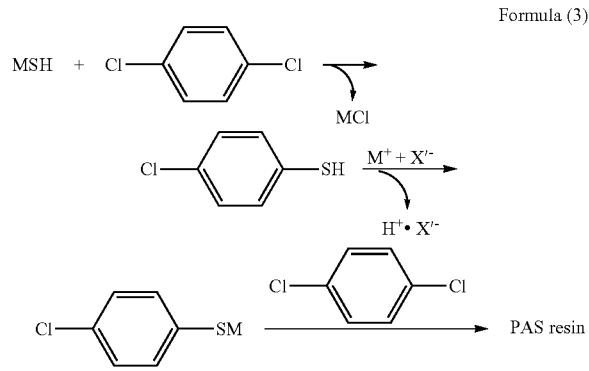

Formula (3)

(In the formula, M represents an alkali metal atom.)

The present invention is characterized by allowing a polyhaloaromatic compound (a), an alkali metal hydrosulfide (b), and an alkali metal salt (c2) of a hydrolysate of the compound (c1) to react with each other in the form of a slurry in the presence of a solid alkali metal sulfide and an aprotic polar organic solvent in a state where the amount of water in the reaction system is reduced as much as possible in this manner. In the present invention, by conducting a heterogeneous reaction in the reaction system using a sulfidizing agent in a solid form in this manner, side reactions can be suppressed and a crude polyarylene sulfide resin having a higher molecular weight can be produced.

In the above reaction, the existing ratio of the organic acid alkali metal salt (c) is preferably 0.01 moles or more and less than 0.9 moles, and particularly preferably 0.04 to 0.4 moles relative to 1 mole of sulfur atoms present in the reaction system from the viewpoint that the effect of suppressing side reactions becomes significant.

The polyhaloaromatic compound (a) in the reaction of step 3 may be added in the reaction system in step 3. Alternatively, as described above, when the polyhaloaromatic compound (a) is used as the non-hydrolyzable organic solvent in step 1, the reaction of step 3 can be carried out directly.

In addition, with regard to the alkali metal hydrosulfide (b), it is possible to carry out the reaction of step 3 by using the alkali metal hydrosulfide that is present in the slurry (I) through step 2 as it is.

Further, after the reaction of the polyhaloaromatic compound (a), the alkali metal hydrosulfide (b), and the alkali metal salt (c2) of a hydrolysate of the aliphatic cyclic compound (c1), as shown in the following formula (4), the hydrolysate of the aliphatic cyclic compound (c1), which has been involved in the reaction, produces the alkali metal hydrosulfide (b) again by an ion exchange reaction with the solid alkali metal sulfide in the slurry. As a result, the polymerization reaction represented by the above formula (3) can be allowed to proceed.

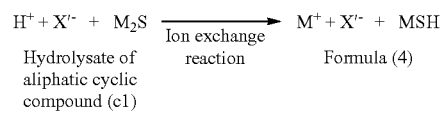

Hydrolysate of aliphatic cyclic compound (c1)

Formula (4)

In this manner, in the reaction of step 3, the solid alkali metal sulfide is gradually converted into a required amount of the alkali metal hydrosulfide (b) and alkali metal salt (c2) of a hydrolysate of the compound (c1) through this type of cycle, and is supplied into the reaction system as a sulfidizing agent. Thus, the side reactions can be suppressed.

In addition, in step 3, a lithium salt compound may be added into the reaction system, and the reaction may be carried out in the presence of lithium ions.

Examples of the lithium salt compound that can be used herein include inorganic lithium salt compounds such as lithium fluoride, lithium chloride, lithium bromide, lithium iodide, lithium carbonate, lithium hydrogen carbonate, lithium sulfate, lithium hydrogen sulfate, lithium phosphate, lithium hydrogen phosphate, lithium dihydrogen phosphate, lithium nitrite, lithium sulfite, lithium chlorate, lithium chromate, lithium molybdate, lithium formate, lithium acetate, lithium oxalate, lithium malonate, lithium propionate, lithium butyrate, lithium isobutyrate, lithium maleate, lithium fumarate, lithium butanedioate, lithium valerate, lithium hexanoate, lithium octanoate, lithium tartrate, lithium stearate, lithium oleate, lithium benzoate, lithium phthalate, lithium benzenesulfonate, lithium p-toluenesulfonate, lithium sulfide, lithium hydrosulfide, and lithium hydroxide; and organic lithium salt compounds such as lithium methoxide, lithium ethoxide, lithium propoxide, lithium isopropoxide, lithium butoxide and lithium phenoxide or the like. Among these compounds, lithium chloride and lithium acetate are preferable, and lithium chloride is particularly preferable. In addition, the lithium salt compounds described above can be used in the form of an anhydride, a hydrate or an aqueous solution.

The amount of lithium ions in the reaction system in step 3 is preferably within the range of at least 0.01 moles and less than 0.9 moles, when the total number of moles of the hydrous alkali metal sulfide used in step 1 and the sulfidizing agent added thereafter is 1 mole from the viewpoint that the effect of improving reactivity in step 3 becomes significant. In particular, the existing ratio of the organic acid alkali metal salt (c) is particularly preferably 0.04 to 0.4 moles relative to 1 mole of sulfur atoms present in the reaction system, and the amount of lithium ions in the reaction system is within the range of 1.8 to 2.2 moles relative to the organic acid alkali metal salt (c) on a molar basis from the viewpoint that the molecular weight of a crude polyarylene sulfide resin is further increased.

In addition, as described above, the alkali metal hydrosulfide (b), which is a raw material for the reaction and polymerization reaction in step 3, is sequentially supplied to the reaction system by gradually converting the solid alkali metal sulfide in the slurry (I) into the alkali metal hydrosulfide (b). If necessary, the alkali metal hydrosulfide (b) may be separately added at any stage of step 3. Examples of the alkali metal hydrosulfide (b) that can be used herein include lithium hydrosulfide, sodium hydrosulfide, potassium hydrosulfide, rubidium hydrosulfide, cesium hydrosulfide, and hydrates thereof. Among these, lithium hydrosulfide and sodium hydrosulfide are preferable, and sodium hydrosulfide is particularly preferable.

In addition, a small amount of alkali metal hydroxide may be added so as to react with an alkali metal hydrosulfide (b) and an alkali metal thiosulfate that are present in trace amounts in the alkali metal sulfide constituting the solid component of the slurry.

A specific method for conducting the reaction and polymerization in step 3 preferably includes adding, to the slurry (I) obtained through steps 1 and 2, as required, the polyhaloaromatic compound (a), the alkali metal hydrosulfide (b), an aprotic polar organic solvent, and the aforementioned lithium salt compound; and conducting the reaction and polymerization at a temperature within the range of 180 to 300° C., preferably within the range of 200 to 280° C. Although the polymerization reaction can be carried out at a constant temperature, it can also be carried out by raising the temperature in a stepwise manner or continuously.

In addition, more specifically, the amount of polyhaloaromatic compound (a) in step 3 is preferably within the range of 0.8 to 1.2 moles, and particularly preferably within the range of 0.9 to 1.1 moles per mole of sulfur atoms in the reaction system from the viewpoint that a crude polyarylene sulfide resin having a higher molecular weight can be obtained.

In the reaction and polymerization reaction in step 3, an aprotic polar organic solvent may be further added. Although the total amount of aprotic polar organic solvent present in the reaction is not particularly limited, it is preferable to add the aprotic polar organic solvent within the range of 0.6 to 10 moles per mole of sulfur atoms present in the reaction system, and it is more preferable to add it within the range of 2 to 6 moles from the viewpoint that a further increase in the molecular weight of a PAS resin can be achieved. In addition, from the viewpoint of an increase in the concentration of reactants per volume of a reaction vessel, the amount is preferably within the range of 1 to 3 moles per mole of sulfur atoms present in the reaction system.

Further, in the reaction and polymerization in step 3, the amount of water in the reaction system becomes substantially anhydrous in the initial stage. In other words, the water used in hydrolysis of the aforementioned aliphatic cyclic compound (c1) in the dehydration step in step 1 appears in the reaction system as a result of a ring closure reaction of the hydrolysate after the solid component in the slurry disappears. Therefore, in step 3 of the present invention, the amount of water in the polymerization slurry at the time when a consumption rate of the solid alkali metal sulfide is 10% is preferably within the range of 0.2% by mass or less from the viewpoint of increasing the molecular weight of the ultimately obtained crude polyarylene sulfide resin.

As for a device used in steps 1 to 3 described in detail above, first, an example of the dehydration device used in steps 1 and 2 is a dehydration vessel equipped with a stirrer, a distillation line, a condenser, a decanter, a distillate return line, an exhaust line, a hydrogen sulfide trapping unit, and a heater. In addition, the reaction vessel used for the dehydration treatments in steps 1 and 2 and the reaction and polymerization in step 3 is not particularly limited, although it is preferable to use a reaction vessel whose liquid contact portion is made of titanium, chromium, zirconium or the like.

A common polymerization method such as a batch system or continuous system can be employed in the respective steps of the dehydration treatments in steps 1 and 2 and the reaction and polymerization in step 3. In addition, it is preferable to carry out both dehydration step and polymerization step under an inert gas atmosphere. Examples of the inert gas to be used include nitrogen, helium, neon and argon. Among these, nitrogen is preferable in terms of economic efficiency and the ease of handling.

Step 4 is a step of subjecting the crude polyarylene sulfide resin obtained in step 3 to a deionization treatment.

Examples of the method for the deionization treatment of a reaction mixture containing the crude polyarylene sulfide resin obtained by the polymerization step include, but are not particularly limited to, (1) a method in which, after the completion of a polymerization reaction, the reaction mixture as it is or after the addition of an acid or a base thereto is first subjected to distillation for removing the solvent under reduced pressure or atmospheric pressure, and subsequently, the solid matter obtained after distilling off the solvent is washed once, or twice or more times with a solvent such as water, acetone, methyl ethyl ketone or an alcohol, and then the resultant is further subjected to neutralization, washing with water, filtration, and drying; (2) a method in which, after the completion of a polymerization reaction, a solvent such as water, acetone, methyl ethyl ketone, an alcohol, an ether, a halogenated hydrocarbon, an aromatic hydrocarbon or an aliphatic hydrocarbon (a solvent which is soluble in the polymerization solvent used and is also a poor solvent at least with respect to the polyarylene sulfide resin (A)) is added to the reaction mixture as a precipitating agent to precipitate solid products such as the polyarylene sulfide resin (A) and an inorganic salt, and these solid products are subjected to separation by filtration, washing, and drying; and (3) a method in which, after the completion of a polymerization reaction, a reaction solvent (or an organic solvent having a solubility with respect to a low molecular weight polymer which is equivalent to that of the reaction solvent) is added to the reaction mixture followed by stirring, a low molecular weight polymer is removed by filtration, and the resultant is washed once, or twice or more times with a solvent such as water, acetone, methyl ethyl ketone or an alcohol, and then subjected to neutralization, washing with water, filtration, and drying.

It should be noted that in the deionization treatment method as mentioned in (1) to (3) above, the drying of the polyarylene sulfide resin (A) may be conducted under vacuum, in air, or in an atmosphere of an inert gas such as nitrogen.

The polyarylene sulfide resin (A) obtained in this manner can be used as it is for various materials for hollow blow-molding or the like, or may be subjected to oxidative cross-linking by conducting a heat treatment in air, in oxygen-enriched air, or under reduced pressure. The temperature for this heat treatment varies depending on the target time for a cross-linking treatment and the type of atmosphere for the treatment, but is preferably within the range of 180 to 270° C. In addition, the above heat treatment may be conducted using an extruder or the like at a temperature equal to or higher than the melting point of the PAS resin in a state where the polyarylene sulfide resin (A) is melted. However, the heat treatment is preferably conducted at a temperature of the melting point plus 100° C. or lower because the possibility of thermal degradation of the polyarylene sulfide resin (A) increases.

Next, an epoxy group-containing polyolefin (B) used in the present invention will be described.

The polyolefin (B) is not particularly limited as long as it is an olefin-based polymer having an epoxy group, and a copolymer composed of α-olefin and a glycidyl ester of α,β-unsaturated acid is preferably used. Examples of the α-olefin include ethylene, propylene and butene-1. In addition, specific examples of the glycidyl ester of α,β-unsaturated acid include glycidyl acrylate, glycidyl methacrylate and glycidyl ethacrylate. The denaturation ratio of each monomer component relative to the α-olefin is not particularly limited, although when the denatured sites in the copolymer are converted into the mass of each monomer, the range of 0.1 to 15 parts by mass, and in particular, 0.5 to 10 parts by mass relative to 100 parts by mass of the copolymer is preferable.

Other olefin-based monomers such as methyl acrylate, methyl methacrylate, acrylonitrile, styrene, vinyl acetate and vinyl ether may be copolymerized with the epoxy group-containing olefin-based polymer as long as the effects of the present invention are not impaired.

Although the melt viscosity of the polyolefin having an epoxy group used in the present invention is not particularly limited, it is preferably within the range of 1 to 20 poise as measured by the melt flow rate (at a temperature of 190° C., with a load of 2.16 kg).

The mixing ratio of the polyolefin having an epoxy group used in the present invention is within the range of 5 to 30 parts by mass, preferably 7 to 20 parts by mass relative to 100 parts by mass of the polyarylene sulfide resin (A). By adopting the mixing ratio of this range, drawdown of the parison during molding is less likely to occur, and it becomes possible to obtain a hollow blow-molded article exhibiting favorable blow moldability and also with excellent heat resistance and chemical resistance. When the blended amount of polyarylene sulfide resin (A) exceeds 95% by mass, it is undesirable because the blow moldability deteriorates. On the other hand, when the blended amount of polyarylene sulfide resin (A) is less than 70% by weight, it is undesirable because the heat resistance and chemical resistance are impaired.

In addition, the resin composition for hollow blow-molded article obtained by the present invention may contain various fillers in order to further improve the performance such as the strength, heat resistance and dimensional stability.

As a filler, conventionally known materials can be used as long as the effects of the present invention are not impaired, and examples thereof include fillers of various shapes such as granular fillers and fibrous fillers.

More specifically, examples of the fibrous fillers that can be used include fibers such as glass fibers, carbon fibers, silane glass fibers, ceramic fibers, aramid fibers, metal fibers, potassium titanate, silicon carbide, calcium sulfate and calcium silicate; and natural fibers such as wollastonite. In addition, barium sulfate, calcium sulfate, clay, pyrophyllite, bentonite, sericite, zeolite, mica, isinglass, talc, attapulgite, ferrite, calcium silicate, calcium carbonate, magnesium carbonate and glass beads or the like can also be used.

The filler used in the present invention is not an essential component. However, by adding more than 0 parts by mass, and typically 10 parts by weight or more and 50 parts by mass or less of the filler, relative to 100 parts by mass of the aforementioned polyarylene sulfide resin, it is possible to improve various performances such as the strength, stiffness, heat resistance, heat dissipation properties and dimensional stability, depending on the purpose of the filler added.

In addition, in the resin composition for blow-molded article of the present invention, various additives such as mold release agents, colorants, heat stabilizers, UV stabilizers, foaming agents, rust inhibitors, flame retardants and lubricants can be added as additives during the molding process. Depending on the application, the resin may also be used as a resin composition added with, where appropriate, synthetic resins such as polyester, polyamide, polyimide, polyetherimide, polycarbonate, polyphenylene ether, polysulfone, polyether sulfone, polyether ether ketone, polyether ketone, polyarylene, polyethylene, polypropylene, polytetrafluoroethylene, polydifluoroethylene, polystyrene, an ABS resin, an epoxy resin, a silicone resin, a phenol resin, a urethane resin and a liquid crystal polymer; elastomers such as polyolefin rubber, fluorine rubber and silicone rubber; coupling agents; and other additives such as fillers, if necessary.

The amount of these additives used and the method of using them may vary depending on the purpose of each additive and cannot be generally specified, but may be used in a range that does not impair the effects of the present invention. For example, a coupling agent can be used alone as an additive or may also be used after being subjected to a preliminary treatment with a filler in advance. Silane-based coupling agents and titanium-based coupling agents are used as these coupling agents. Furthermore, among these, preferred examples thereof include a silane coupling agent having a functional group (for example, an epoxy group, an isocyanate group, an amino group and a hydroxyl group) that reacts with the carboxyl group. Examples of these silane coupling agents include epoxy group-containing alkoxysilane compounds such as γ-glycidoxypropyltrimethoxysilane, γ-glycidoxypropyltriethoxysilane and β-(3,4-epoxycyclohexyl)ethyltrimethoxysilane; isocyanato group-containing alkoxysilane compounds such as γ-isocyanatopropyltrimethoxysilane, γ-isocyanatopropyltriethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane and γ-isocyanatopropyltrichlorosilane; amino group-containing alkoxysilane compounds such as γ-(2-aminoethyl)aminopropylmethyldimethoxysilane, γ-(2-aminoethyl)aminopropyltrimethoxysilane and γ-aminopropyltrimethoxysilane; and hydroxyl group-containing alkoxysilane compounds such as γ-hydroxypropyltrimethoxysilane and γ-hydroxypropyltriethoxysilane or the like. The amount of coupling agent used is within the range from 0.01 to 1.0 part by mass, and more preferably from 0.1 to 0.4 parts by mass, relative to 100 parts by mass of the polyarylene sulfide resin (B).

The method of producing a resin composition for hollow blow-molded article according to the present invention is not particularly limited, and examples thereof include a method in which the polyarylene sulfide resin (A) serving as a raw material and the polyolefin (B) having an epoxy group are charged into a ribbon blender, a Henschel mixer, a V-blender or the like for dry blending in various forms such as powders, pellets and strips, and are then melted and kneaded using a Banbury mixer, a mixing roll, a uniaxial or biaxial extruder and kneader, or the like. In particular, a method of melting and kneading using a uniaxial or biaxial extruder having a satisfactory kneading power is typical.

The resin composition for hollow blow-molded article according to the present invention obtained in this manner exhibits excellent moldability, drawdown resistance and extrusion stability. For example, when the resin composition pellets are loaded into a melt indexer with a cylinder temperature of 330° C. and an orifice system of 1 mm, and the melt flow rate (g/10 minutes) is measured after applying a load of 10 kg and preheating for 5 minutes, those having the melt flow rate of 20 g/10 minutes or less, preferably 15 g/10 minutes or less exhibit a favorable drawdown resistance which is suitable for the hollow blow moldability. Furthermore, the range of 3 to 10 g/10 minutes is preferable and the range of 3 to 6 g/10 minutes is most preferable because the drawdown resistance and extrusion stability are excellent. If the melt flow rate is more than 20 g/10 minutes, variations in the thickness of the molded article become significant, which is undesirable. On the other hand, the melt flow rate of less than 3 tends to result in gelled products, which is undesirable.

The resin composition for hollow blow-molded article according to the present invention prepared in the manner as described above can be obtained by a generally known blow molding method, that is, basically a resin composition is supplied to an extruder and melted and extruded to mold the parison, followed by molding the resultant into an intended, two to three-dimensional hollow molded body. Typical examples of the generally known blow molding method include a direct blow molding method, an accumulator blow molding method and a multi-dimensional blow molding method. Alternatively, needless to say, it is also possible to employ a multilayer blow molding method, an exchange blow molding method, or the like that is used in combination with other materials.

Since the blow-molded article according to the present invention obtained in this manner exhibits excellent moldability and also has various functions that are originally possessed by polyarylene sulfide, such as the heat resistance, dimensional stability, chemical resistance, impact resistance, and mechanical strength, such as the thermal shock resistance, the blow-molded article can be widely used as a hollow molded article in the forms of bottles, tanks, ducts and the like, for chemical containers, air-conditioning ducts, and ducts and pipes for the hot gas discharged from the internal combustion engines, such as automobiles, or fuel cells.

EXAMPLES

The present invention will be described below in more detail based on a series of examples, although the present invention is in no way limited only to these examples.

Method For Determination of Carboxyl Group And Alkali Metal Salt

The amounts of carboxyl groups (a1) and the alkali metal salt thereof (a2) contained in the polyarylene sulfide (A) were measured by the following method. (Pretreatment) First, as a pretreatment, the polyarylene sulfides obtained in Examples and Comparative Examples were dissolved once at 210° C. in dimethyl imidazolidinone (DMI) under an inert atmosphere, and were then cooled to precipitate the polyarylene sulfides again. Subsequently, the obtained slurry was thoroughly washed with ion exchanged water and filtered many times, followed by the adjustment of pH to 2.5 or less with hydrochloric acid, and the washing with ion exchanged water was repeated many times again. The resulting cake was dried at 120° C. in a hot-air dryer. The resultant was defined as a sample (0), and a sample that did not undergo a pretreatment was defined as a sample (1).

Then, the polyarylene sulfides used in each of the Examples and Comparative Examples were pressed into a disk-shape using a pressing machine, and the measurements were made using an FT-IR microspectrometer. Subsequently, among the absorption results obtained, the relative intensity of the absorption at 1705 cm$^{-1}$ relative to the absorption at 2666 cm$^{-1}$ was determined. Separately, a predetermined amount of p-chlorophenylacetate was mixed in polyarylene sulfide, and the relative intensity of the absorption intensity at 1705 cm$^{-1}$ relative to the absorption intensity at 2666 cm$^{-1}$ in the absorption curve obtained by the same operation was plotted to obtain a calibration curve. The numerical value obtained from the calibration curve was regarded as the amount of carboxyl group contained in the polyarylene sulfide.

Then, based on the prepared calibration curve, the amounts of carboxyl groups and the alkali metal salts thereof in the measurement sample were determined.

Note that when the amount of carboxyl groups in the sample (0) was (a0) μmol/g and the amount of carboxyl groups in the sample (1) was (a1) μmol/g, the content of alkali metal salts of carboxyl group (a2) μmol/g was determined by the following equation:

$$(a2)=(a0)-(a1) \, (\mu mol/g)$$

Measurement of Non-Newtonian Index

The non-Newtonian index is a value calculated from shear rate and share stress using the formula shown below. The shear rate and shear stress were measured using a capillograph under the conditions of 300° C. and L/D=40. The structure of PPS becomes closer to a linear structure as the N value gets closer to 1, and the degree of branching of the structure increases as the N value increases.

$$SR=K \cdot SS^N \quad (II)$$

where SR denotes the shear rate (sec$^{-1}$), SS denotes the shear stress (dyne/cm$^2$), and K denotes a constant.

Method of Measuring Melt Viscosity V6

The melt viscosity was measured using a flow tester "CFT-500C model" manufactured by Shimadzu Corporation after holding for 6 minutes by use of an orifice having an orifice length and an orifice diameter so that the former/latter ratio is 10/1 at a temperature of 300° C., a shear rate of 10 sec$^{-1}$ and a load of 1.96 MPa.

Melting Point

By using a differential scanning calorimeter ("PYRIS Diamond DSC" manufactured by PerkinElmer Inc.), a temperature indicating the maximum endothermic peak based on the analytical method by differential scanning calorimetry (DSC method; conforming to its K-7121) was measured as the melting point.

Example 1

Step 1

Into a 150 liter autoclave equipped with a stirring blade and connected to a pressure gauge, a thermometer, a condenser, a decanter and a rectifying column, 33.222 kg (226 moles) of p-dichlorobenzene (hereinafter abbreviated as "p-DCB"), 4.560 kg (46 moles) of NMP, 27.300 kg (230 moles on a NaSH basis) of a 47.23% by mass aqueous NaSH solution, and 18.533 g (228 moles on a NaOH basis) of a 49.21% by mass aqueous NaOH solution were charged. The temperature of the resulting reaction mixture was increased to 173° C. over a period of five hours in a nitrogen atmosphere while stirring, 26.794 kg of water was distilled, and the autoclave was then sealed. The p-DCB distilled by azeotropy during dehydration was separated by the decanter, and returned into the autoclave as needed. A particulate anhydrous sodium sulfide composition was dispersed in p-DCB inside the autoclave after the completion of dehydration. The NMP content in this composition was 0.089 kg (0.9 moles). This result shows that 98% (45.1 moles) of the charged NMP was hydrolyzed into SMAB. The amount of SMAB in the autoclave was 0.196 moles per mole of sulfur atoms present in the autoclave. If all the charged NaSH and NaOH are changed to anhydrous Na2S, the theoretical amount of dehydration is estimated to be 27.921 g. Accordingly, the above result indicates that, out of 1127 g (62.6 moles) of water remaining inside the autoclave, 812 g (45.1 moles) of water was consumed in the hydrolysis reaction between NMP and NaOH and was not present in the autoclave as water, and the residual 315 g (17.5 moles) of water remained in the autoclave in the form of water or crystal water. The amount of water in the autoclave was 0.076 moles per mole of sulfur atoms present in the autoclave.

Step 2

After the completion of the dehydration step described above, the inner temperature was cooled to 160° C., 45.203 kg (456 moles) of NMP was charged, and the temperature was increased to 185° C. The amount of water in the autoclave was 0.038 moles per mole of NMP charged in step 2. At the time when the gauge pressure reached 0.00 MPa, a valve connected to the rectifying column was opened, and the inner temperature was increased to 200° C. over a period of one hour. At this time, the temperature at an outlet of the rectifying column was controlled to be 110° C. or lower by cooling and adjusting the degree of opening of the valve. A mixed vapor of the distilled p-DCB and water was condensed in the condenser and separated by the decanter, and p-DCB was returned to the autoclave. The amount of distilled water was 273 g (15.2 moles).

Step 3

The amount of water in the autoclave at the start of step 3 was 42 g (2.3 moles), and was 0.005 moles per mole of NMP charged in step 2, and 0.010 moles per mole of sulfur atoms present in the autoclave. The amount of SMAB in the autoclave was 0.196 moles per mole of sulfur atoms present in the autoclave as in step 1. Subsequently, the inner temperature was increased from 200° C. to 230° C. over a period of three hours, and stirring was conducted at 230° C. for three hours. The inner temperature was then increased to 250° C., and stirring was conducted for one hour. The gauge pressure at the time of an inner temperature of 200° C. was 0.03 MPa, and the final gauge pressure was 0.50 MPa. After cooling, 650 g of the thus obtained slurry was poured into 3 liters of water, and the mixture was stirred at 80° C. for one hour and was then filtered. The resulting cake was stirred again for one hour in 3 liters of hot water, washed, and then filtered. This operation was repeated four times. After adding 3 liters of hot water and acetic acid to the cake to adjust the pH to 4.0, the resulting cake was stirred again for one hour therein, washed, and then filtered. The resulting cake was stirred again for one hour in 3 liters of hot water, washed, and then filtered. This operation was repeated twice. The resulting product was dried overnight at 120° C. using a hot air dryer to obtain 151 g of a PPS resin (P-1) in the form of a white powder. The melt viscosity of this polymer at 300° C. was about 1,200 poise. The non-Newtonian index was 0.99. The content of carboxyl groups was 44 μmol/g, and the content of alkali metal salts was 9.6 μmol/g.

Example 2

Step 1

Into a 150 liter autoclave equipped with a stirring blade and connected to a pressure gauge, a thermometer, a condenser, a decanter and a rectifying column, 33.222 kg (226 moles) of p-dichlorobenzene (hereinafter abbreviated as "p-DCB"), 3.420 kg (34.5 moles) of NMP, 27.300 kg (230 moles on a NaSH basis) of a 47.23% by mass aqueous NaSH solution, and 18.533 g (228 moles on a NaOH basis) of a 49.21% by mass aqueous NaOH solution were charged. The temperature of the resulting reaction mixture was increased to 173° C. over a period of five hours in a nitrogen atmosphere while stirring, 27.300 kg of water was distilled, and the autoclave was then sealed. The p-DCB distilled by azeotropy during dehydration was separated by the decanter, and returned into the autoclave as needed. A particulate anhydrous sodium sulfide composition was dispersed in p-DCB inside the autoclave after the completion of dehydration. The NMP content in this composition was 0.079 kg (0.8 moles). This result shows that 98 mole% (33.7 moles) of the charged NMP was hydrolyzed into a sodium salt of a ring-opened product of NMP (4-(methylamino)butyric acid) (hereinafter abbreviated as "SMAB"). The amount of SMAB in the autoclave was 0.147 moles per mole of sulfur atoms present in the autoclave. If all the charged NaSH and NaOH are changed to anhydrous Na$_2$S, the theoretical amount of dehydration is estimated to be 27.921 g. Accordingly, the above result indicates that, out of 878 g (48.8 moles) of water remaining in the autoclave, 609 g (33.8 moles) of water was consumed in the hydrolysis reaction between NMP and NaOH and was not present in the autoclave as water, and the residual 269 g (14.9 moles) of water remained in the autoclave in the form of water or crystal water. The amount of water in the autoclave was 0.065 moles per mole of sulfur atoms present in the autoclave.

Step 2

After the completion of the dehydration step described above, the inner temperature was cooled to 160° C., 46.343 kg (467.5 moles) of NMP was charged, and the temperature was increased to 185° C. The amount of water in the autoclave was 0.025 moles per mole of NMP charged in step 2. At the time when the gauge pressure reached 0.00 MPa, a valve connected to the rectifying column was opened, and the inner temperature was increased to 200° C. over a period of one hour. At this time, the temperature at an outlet of the rectifying column was controlled to be 110° C. or lower by cooling and adjusting the degree of opening of the valve. A mixed vapor of the distilled p-DCB and water was condensed in the condenser and separated by the decanter, and p-DCB was returned to the autoclave. The amount of distilled water was 228 g (12.7 moles).

Step 3

The amount of water in the autoclave at the start of step 3 was 41 g (2.3 moles), and was 0.005 moles per mole of NMP charged in step 2, and 0.010 moles per mole of sulfur atoms present in the autoclave. The amount of SMAB in the autoclave was 0.147 moles per mole of sulfur atoms present in the autoclave as in step 1. Subsequently, the inner temperature was increased from 200° C. to 230° C. over a period of three hours, and stirring was conducted at 230° C. for three hours. The inner temperature was then increased to 250° C., and stirring was conducted for one hour. The gauge pressure at the time of an inner temperature of 200° C. was 0.03 MPa, and the final gauge pressure was 0.40 MPa. After cooling, 650 g of the thus obtained slurry was poured into 3 liters of water, and the mixture was stirred at 80° C. for one hour and was then filtered. The resulting cake was stirred again for one hour in 3 liters of hot water, washed, and then filtered. This operation was repeated four times. After adding 3 liters of hot water and acetic acid to the cake to adjust the pH to 4.0, the resulting cake was stirred again for one hour therein, washed, and then filtered. The resulting cake was stirred again for one hour in 3 liters of hot water, washed, and then filtered. This operation was repeated twice. The resulting product was dried overnight at 120° C. using a hot air dryer to obtain 151 g of a PPS resin (P-2) in the form of a white powder. The melt viscosity of this polymer at 300° C. was about 1,800 poise. The non-Newtonian index was 1.02. The content of carboxyl groups was 38 µmol/g, and the content of alkali metal salts was 4.8 µmol/g.

Example 3

Step 1

Into a 150 liter autoclave equipped with a stirring blade and connected to a pressure gauge, a thermometer, a condenser, a decanter and a rectifying column, 33.222 kg (226 moles) of p-dichlorobenzene (hereinafter abbreviated as "p-DCB"), 2.280 kg (23 moles) of NMP, 27.300 kg (230 moles on a NaSH basis) of a 47.23% by mass aqueous NaSH solution, and 18.533 g (228 moles on a NaOH basis) of a 49.21% by mass aqueous NaOH solution were charged. The temperature of the resulting reaction mixture was increased to 173° C. over a period of five hours in a nitrogen atmosphere while stirring, 27.300 kg of water was distilled, and the autoclave was then sealed. The p-DCB distilled by azeotropy during dehydration was separated by the decanter, and returned into the autoclave as needed. A particulate anhydrous sodium sulfide composition was dispersed in p-DCB inside the autoclave after the completion of dehydration. The NMP content in this composition was 0.069 kg (0.7 moles). This result shows that 97mole % (22.3 moles) of the charged NMP was hydrolyzed into a sodium salt of a ring-opened product of NMP (4-(methylamino)butyric acid) (hereinafter abbreviated as "SMAB"). The amount of SMAS in the autoclave was 0.097 moles per mole of sulfur atoms present in the autoclave. If all the charged NaSH and NaOH are changed to anhydrous Na$_2$S, the theoretical amount of dehydration is estimated to be 27.921 kg. Accordingly, the above result indicates that, out of 621 g (34.5 moles) of water remaining in the autoclave, 401 g (22.3 moles) of water was consumed in the hydrolysis reaction between NMP and NaOH and was not present in the autoclave as water, and the residual 220 g (12.2 moles) of water remained in the autoclave in the form of water or crystal water. The amount of water in the autoclave was 0.053 moles per mole of sulfur atoms present in the autoclave.

Step 2

After the completion of the dehydration step described above, the inner temperature was cooled to 160° C., 47.492 kg (479 moles) of NMP was charged, and the temperature was increased to 185° C. The amount of water in the autoclave was 0.025 moles per mole of NMP charged in step 2. At the time when the gauge pressure reached 0.00 MPa, a valve connected to the rectifying column was opened, and the inner temperature was increased to 200° C. over a period of one hour. At this time, the temperature at an outlet of the rectifying column was controlled to be 110° C. or lower by cooling and adjusting the degree of opening of the valve. A mixed vapor of the distilled p-DCB and water was condensed in the condenser and separated by the decanter, and p-DCB was returned to the autoclave. The amount of distilled water was 179 g (9.9 moles).

Step 3

The amount of water in the autoclave at the start of step 3 was 41 g (2.3 moles), and was 0.005 moles per mole of NMP charged in step 2, and 0.010 moles per mole of sulfur atoms present in the autoclave. The amount of SMAB in the autoclave was 0.097 moles per mole of sulfur atoms present in the autoclave as in step 1. Subsequently, the inner temperature was increased from 200° C. to 230° C. over a period of three hours, and stirring was conducted at 230° C. for three hours. The inner temperature was then increased to 250° C., and stiffing was conducted for one hour. The gauge pressure at the time of an inner temperature of 200° C. was 0.03 MPa, and the final gauge pressure was 0.30 MPa. After cooling, 650 g of the thus obtained slurry was poured into 3 liters of water, and the mixture was stirred at 80° C. for one hour and was then filtered. The resulting cake was stirred again for one hour in 3 liters of hot water, washed, and then filtered. This operation was repeated four times. After adding 3 liters of hot water and acetic acid to the cake to to adjust the pH to 4.0, the resulting cake was stirred again for one hour therein, washed, and then filtered. The resulting cake was stirred again for one hour in 3 liters of hot water, washed, and then filtered. This operation was repeated twice. The resulting product was dried overnight at 120° C. using a hot air dryer to obtain 151 g of a PPS resin (P-3) in the form of a white powder. The melt viscosity of this polymer at 300° C. was about 2,100 poise. The non-Newtonian index was 1.01. The content of carboxyl groups was 31 µmol/g, and the content of alkali metal salts was 3.0 µmol/g.

Comparative Example 1

Into an autoclave, 3.20 kg of sodium sulfide (25 moles, including 40% of crystal water), 4 g of sodium hydroxide, 1.36 kg of sodium acetate trihydrate (about 10 moles) and 7.9 kg of N-methyl-2-pyrrolidone (hereinafter abbreviated as NMP), were charged. The temperature of the resulting reaction mixture was gradually increased to 205° C. while stirring, and about 1.5 liters of distilled water including 1.36 kg of water were removed.

3.75 kg (25.5 moles) of 1,4-dichlorobenzene and 2 kg of NMP were added to the remaining mixture, and the resulting mixture was heated for 3 hours at 265° C. The reaction product was washed five times with a hot water of 70° C. and dried under reduced pressure for 24 hours at 80° C. to obtain about 2 kg of a PPS resin powder having a melt viscosity of about 1,700 poise (300° C., shear rate of 10 sec$^{-1}$). About 2 kg of the thus obtained PPS resin powder was added in 20 liters of an aqueous solution of acetic acid which was heated to 90° C. and had a pH of 4, and the resulting mixture was continuously stirred for about 30 minutes and was then filtered. The resulting filtrate was washed with deionized water of about 90° C. until the pH of the filtrate became 7, and was then dried under reduced pressure for 24 hours at 120° C. to obtain a PPS resin (P-4) powder. The content of carboxyl groups in the resin was 50 µmol/g.

Examples 4 To 8 And Comparative Examples 3 To 5

Method of Producing Pellet of PAS Resin Composition

With respect to 100 parts by mass of a polyarylene sulfide resin, 0.4 parts by mass of γ-glycidoxypropyltrimethoxysilane and a copolymer of ethylene/glycidyl methacrylate (6% by mass)/methyl acrylate (27% by mass) (hereinafter referred to as "polyolefin" in the table) were mixed in accordance with a mixing ratio described in Table 1. Then, the resulting mixture was loaded in a twin-screw extruder, and glass fibers (the chopped strands of glass fibers having a fiber diameter of 10 μm and a length of 3 mm) were supplied from a side feeder at a rate of 20 parts by mass relative to 100 parts by mass of a polyarylene sulfide resin composition while melting and kneading the resulting mixture at a set temperature of 310° C. to obtain a pellet of the polyarylene sulfide resin composition.

Subsequently, various tests were carried out using the pellet of this polyarylene sulfide resin composition.

Melt Viscosity

The resin composition pellet was loaded into a melt indexer with a cylinder temperature of 330° C. and an orifice system of 1 mm, and the melt flow rate was measured after applying a load of 10 kg and preheating for 5 minutes.

Drawdown Resistance/Extrusion Stability

The aforementioned melt viscosity was used as an indicator of the drawdown resistance and extrusion stability at the time of blow molding, and those with a melt viscosity of 3 to 10 g/10 minutes were evaluated as "satisfactory" (both the drawdown resistance and the extrusion stability were satisfactory), those with a melt viscosity of less than 3 g/10 minutes were evaluated as "unsatisfactory" (the extrusion stability was unsatisfactory), and those with a melt viscosity of more than 20 g/10 minutes were evaluated as "unsatisfactory" (the drawdown resistance was unsatisfactory).

Uniformity

The resin composition pellet was supplied to a blow molding machine equipped with an extruder having a diameter of 45 mmφ, and extrusion was carried out at a cylinder temperature of 290° C. After molding a parison with an outer diameter of 30 mm and a thickness of 4 mm, air was blown into the mold, so that a cylindrical container having a height of 250 mm, an outer diameter of 50 mm and a thickness of about 2 to 3 mm was molded. The thickness at 5 arbitrary points each from the upper portion (30 mm from the upper end) and lower portion (30 mm from the lower end) of the body of this molded article was measured, and the uniformity thereof was evaluated based on the following criteria:

those in which the difference between the average thickness of upper portion and the average thickness of lower portion was within 0.2 mm were evaluated as "A", those in which the above difference in thickness was greater than 0.2 mm but within 0.5 mm were evaluated as "B", those in which the above difference in thickness was greater than 0.5 mm but within 1.0 mm were evaluated as "C", and those in which the above difference in thickness was greater than 1.0 mm were evaluated as "D".

Thermal Shock Resistance

A molded article was prepared with a shape in which a block made of metal (S55C) was wrapped around with a resin layer having a thickness of 1 mm, and a thermal cycle test (in which one cycle composed of −40° C./30 min to 140° C./30 min) was carried out in the gas phase. The cycle number at which cracks were generated in the outer layer of PPS was used for evaluation.

The evaluation was carried out based on the following criteria.

Rank "IV": peeling occurs in less than 10 cycles
Rank "III": peeling occurs in 10 or more cycles and in less than 50 cycles
Rank "II": cracks occur in 50 or more cycles and in less than 100 cycles
Rank "I": cracks occur in 100 or more cycles Impact Resistance The impact resistance was measured using a dumbbell test piece for tensile test. The resin composition pellet was supplied to an injection molding machine, and the dumbbell test piece for tensile test was molded at a cylinder temperature of 300° C. and a mold temperature of 140° C. The central part of the resultant was cut out into a rod shape having a length of 80 mm, a width of 10 mm and a thickness of 4 mm to be used as a test piece, and the impact strength ($kJ/mm^2$) was measured by carrying out the Charpy impact test.

Heat Resistance

The aforementioned test piece was heated for 3,000 hours in an oven at 240° C., and after pulling out from the oven, the tensile strength was measured. A decrease in tensile strength from that of the test piece which was not heated was expressed as the retention rate (%). Those with a retention rate of more than 60% were evaluated as satisfactory heat resistance and those with a retention rate of 60% or less were evaluated as poor heat resistance.

TABLE 1

|  | Example 4 | Example 5 | Example 6 | Example 7 | Example 8 |
| --- | --- | --- | --- | --- | --- |
| PPS | P-1 | P-1 | P-1 | P-2 | P-3 |
| Polyolefin | 8 | 14 | 28 | 14 | 14 |
| Melt viscosity [g/10 minutes] | 10 | 8 | 5 | 6 | 4 |
| Drawdown resistance/ Extrusion stability | Satisfactory | Satisfactory | Satisfactory | Satisfactory | Satisfactory |
| Uniformity | A | A | A | A | A |
| Thermal shock resistance | I | I | I | I | I |
| Heat resistance [° C.] | Satisfactory | Satisfactory | Satisfactory | Satisfactory | Satisfactory |
| Impact resistance [$kJ/m^2$] | 61 | 68 | 75 | 59 | 66 |

TABLE 2

|  | Comparative Example 3 | Comparative Example 4 | Comparative Example 5 |
| --- | --- | --- | --- |
| PPS | P-1 | P-1 | P-4 |
| Polyolefin | 4 | 35 | 14 |
| Melt viscosity [g/10 minutes] | 60 | 2 | 30 |
| Drawdown resistance/ Extrusion stability | Unsatisfactory | Unsatisfactory | Unsatisfactory |
| Uniformity | C | C | C |
| Thermal shock resistance | III | III | III |

TABLE 2-continued

| | Comparative Example 3 | Comparative Example 4 | Comparative Example 5 |
|---|---|---|---|
| Heat resistance [° C.] | Satisfactory | Unsatisfactory | Satisfactory |
| Impact resistance [kJ/m$^2$] | 61 | 82 | 60 |

The invention claimed is:

1. A method of producing a resin composition for hollow blow-molded article comprising: melting and mixing a polyarylene sulfide resin (A) including a terminal carboxyl group within the resin in an amount of 25 to 45 (μmol/g), and having a non-Newtonian index of 0.90 to 1.15 and also a melt viscosity as measured at 300° C. within the range of 1,000 poise to 3,000 poise, and an epoxy group-containing polyolefin (B) so that a proportion of said epoxy group-containing polyolefin (B) is 5 to 30 parts by mass with respect to 100 parts by mass of said polyarylene sulfide resin (A).

2. The method of producing a resin composition for hollow blow-molded article according to claim 1, wherein the melt flow rate of the resin composition for hollow blow-molded article is 3 to 20 g/10 minutes; when the resin composition pellets are loaded into a melt indexer with a cylinder temperature of 330° C. and an orifice system of 1 mm, and the melt flow rate is measured after applying a load of 10 kg and preheating for 5 minutes.

3. The method of producing a resin composition for hollow blow-molded article according to claim 1, comprising:
reacting a polyhaloaromatic compound (a), an alkali metal hydrosulfide (b) and an organic acid alkali metal salt (c) in the presence of a solid alkali metal sulfide and an aprotic polar organic solvent, so that said organic acid alkali metal salt (c) is used in an amount of at least 0.01 moles and less than 0.9 moles, relative to 1 mole of the combined total of said solid alkali metal sulfide and alkali metal hydrosulfide (b), and also an amount of water present in the reaction system is not more than 0.02 moles relative to 1 mole of said aprotic polar organic solvent to produce a crude polyarylene sulfide resin;
performing a deionization treatment of the crude polyarylene sulfide resin to produce
a polyarylene sulfide resin (A) which includes a terminal carboxyl group within the resin in an amount of 25 to 45 (μmol/g), and has a non-Newtonian index of 0.90 to 1.15 and also a melt viscosity as measured at 300° C. within the range of 1,000 poise to 3,000 poise; and
subsequently melting and kneading the obtained polyarylene sulfide resin (A) with an epoxy group-containing polyolefin (B).

4. A resin composition for hollow blow-molded article obtained by melting and mixing a polyarylene sulfide resin (A) including a terminal carboxyl group in an amount of 25 to 45 (μmol/g) within the resin, and having a non-Newtonian index of 0.90 to 1.15 and also a melt viscosity as measured at 300° C. within the range of 1,000 poise to 3,000 poise and an epoxy group-containing polyolefin (B) so that a proportion of said epoxy group-containing polyolefin (B) is 5 to 30 parts by mass with respect to 100 parts by mass of the polyarylene sulfide resin (A).

5. The resin composition for hollow blow-molded article according to claim 4, wherein the melt flow rate of the resin composition for hollow blow-molded article is 3 to 20 g/10 minutes; when the resin composition pellets are loaded into a melt indexer with a cylinder temperature of 330° C. and an orifice system of 1 mm, and the melt flow rate is measured after applying a load of 10 kg and preheating for 5 minutes.

6. The resin composition for hollow blow-molded article according to claim 4, wherein said polyarylene sulfide resin (A) is a polyarylene sulfide resin containing an alkali metal salt of the carboxyl groups in an amount of 2 to 10 (μmol/g) in the resin.

7. The resin composition for hollow blow-molded article according to claim 4, wherein said polyarylene sulfide resin (A) is obtained by reacting a polyhaloaromatic compound (a), an alkali metal hydrosulfide (b) and an organic acid alkali metal salt (c) in the presence of a solid alkali metal sulfide and an aprotic polar organic solvent, so that said organic acid alkali metal salt (c) is used in an amount of at least 0.01 moles and less than 0.9 moles, relative to 1 mole of the combined total of said solid alkali metal sulfide and alkali metal hydrosulfide (b), and also an amount of water present in the reaction system is not more than 0.02 moles relative to 1 mole of said aprotic polar organic solvent to produce a crude polyarylene sulfide resin, followed by a deionization treatment.

8. The resin composition for hollow blow-molded article according to claim 4, further comprising a filler in an amount of 0.1 to 50 parts by mass with respect to 100 parts by mass of said polyarylene sulfide resin (A), in addition to said polyarylene sulfide resin (A) and epoxy group-containing polyolefin (B).

9. The resin composition for hollow blow-molded article according to claim 4, further comprising an epoxy group-containing silane coupling agent in an amount of 0.01 to 1.0 part by mass with respect to 100 parts by mass of said polyarylene sulfide resin (A), in addition to said polyarylene sulfide resin (A) and epoxy group-containing polyolefin (B).

10. A hollow blow-molded article obtained by hollow blow-molding the resin composition for hollow blow-molded article of claim 4.

11. A method of producing a hollow blow-molded article comprising hollow blow-molding the resin composition for hollow blow-molded article of claim 4.

12. The method of producing a resin composition for hollow blow-molded article according to claim 2, comprising:
reacting a polyhaloaromatic compound (a), an alkali metal hydrosulfide (b) and an organic acid alkali metal salt (c) in the presence of a solid alkali metal sulfide and an aprotic polar organic solvent, so that said organic acid alkali metal salt (c) is used in an amount of at least 0.01 moles and less than 0.9 moles, relative to 1 mole of the combined total of said solid alkali metal sulfide and alkali metal hydrosulfide (b), and also an amount of water present in the reaction system is not more than 0.02 moles relative to 1 mole of said aprotic polar organic solvent to produce a crude polyarylene sulfide resin;
performing a deionization treatment of the crude polyarylene sulfide resin to produce a polyarylene sulfide resin (A) which includes a terminal carboxyl group within the resin in an amount of 25 to 45 (μmol/g), and has a non-Newtonian index of 0.90 to 1.15 and also a melt viscosity as measured at 300° C. within the range of 1,000 poise to 3,000 poise; and subsequently melting and kneading the obtained polyarylene sulfide resin (A) with an epoxy group-containing polyolefin (B).

13. The resin composition for hollow blow-molded article according to claim 5, wherein said polyarylene sulfide resin (A) is a polyarylene sulfide resin containing an alkali metal salt of the carboxyl groups in an amount of 2 to 10 (μmol/g) in the resin.

14. The resin composition for hollow blow-molded article according to claim 5, wherein said polyarylene sulfide resin (A) is obtained by reacting a polyhaloaromatic compound (a), an alkali metal hydrosulfide (b) and an organic acid alkali metal salt (c) in the presence of a solid alkali metal sulfide and an aprotic polar organic solvent, so that said organic acid alkali metal salt (c) is used in an amount of at least 0.01 moles and less than 0.9 moles, relative to 1 mole of the combined total of said solid alkali metal sulfide and alkali metal hydrosulfide (b), and also an amount of water present in the reaction system is not more than 0.02 moles relative to 1 mole of said aprotic polar organic solvent to produce a crude polyarylene sulfide resin, followed by a deionization treatment.

15. The resin composition for hollow blow-molded article according to claim 6, wherein said polyarylene sulfide resin (A) is obtained by reacting a polyhaloaromatic compound (a), an alkali metal hydrosulfide (b) and an organic acid alkali metal salt (c) in the presence of a solid alkali metal sulfide and an aprotic polar organic solvent, so that said organic acid alkali metal salt (c) is used in an amount of at least 0.01 moles and less than 0.9 moles, relative to 1 mole of the combined total of said solid alkali metal sulfide and alkali metal hydrosulfide (b), and also an amount of water present in the reaction system is not more than 0.02 moles relative to 1 mole of said aprotic polar organic solvent to produce a crude polyarylene sulfide resin, followed by a deionization treatment.

16. The resin composition for hollow blow-molded article according to claim 5, further comprising a filler in an amount of 0.1 to 50 parts by mass with respect to 100 parts by mass of said polyarylene sulfide resin (A), in addition to said polyarylene sulfide resin (A) and epoxy group-containing polyolefin (B).

17. The resin composition for hollow blow-molded article according to claim 6, further comprising a filler in an amount of 0.1 to 50 parts by mass with respect to 100 parts by mass of said polyarylene sulfide resin (A), in addition to said polyarylene sulfide resin (A) and epoxy group-containing polyolefin (B).

18. The resin composition for hollow blow-molded article according to claim 7, further comprising a filler in an amount of 0.1 to 50 parts by mass with respect to 100 parts by mass of said polyarylene sulfide resin (A), in addition to said polyarylene sulfide resin (A) and epoxy group-containing polyolefin (B).

19. The resin composition for hollow blow-molded article according to claim 5, further comprising an epoxy group-containing silane coupling agent in an amount of 0.01 to 1.0 part by mass with respect to 100 parts by mass of said polyarylene sulfide resin (A), in addition to said polyarylene sulfide resin (A) and epoxy group-containing polyolefin (B).

20. The resin composition for hollow blow-molded article according to claim 6, further comprising an epoxy group-containing silane coupling agent in an amount of 0.01 to 1.0 part by mass with respect to 100 parts by mass of said polyarylene sulfide resin (A), in addition to said polyarylene sulfide resin (A) and epoxy group-containing polyolefin (B).

21. The resin composition for hollow blow-molded article according to claim 7, further comprising an epoxy group-containing silane coupling agent in an amount of 0.01 to 1.0 part by mass with respect to 100 parts by mass of said polyarylene sulfide resin (A), in addition to said polyarylene sulfide resin (A) and epoxy group-containing polyolefin (B).

22. The resin composition for hollow blow-molded article according to claim 8, further comprising an epoxy group-containing silane coupling agent in an amount of 0.01 to 1.0 part by mass with respect to 100 parts by mass of said polyarylene sulfide resin (A), in addition to said polyarylene sulfide resin (A) and epoxy group-containing polyolefin (B).

23. A hollow blow-molded article obtained by hollow blow-molding the resin composition for hollow blow-molded article of claim 5.

24. A hollow blow-molded article obtained by hollow blow-molding the resin composition for hollow blow-molded article of claim 6.

25. A hollow blow-molded article obtained by hollow blow-molding the resin composition for hollow blow-molded article of claim 7.

26. A hollow blow-molded article obtained by hollow blow-molding the resin composition for hollow blow-molded article of claim 8.

27. A hollow blow-molded article obtained by hollow blow-molding the resin composition for hollow blow-molded article of claim 9.

28. A method of producing a hollow blow-molded article comprising hollow blow-molding the resin composition for hollow blow-molded article of claim 5.

29. A method of producing a hollow blow-molded article comprising hollow blow-molding the resin composition for hollow blow-molded article of claim 6.

30. A method of producing a hollow blow-molded article comprising hollow blow-molding the resin composition for hollow blow-molded article of claim 7.

31. A method of producing a hollow blow-molded article comprising hollow blow-molding the resin composition for hollow blow-molded article of claim 8.

32. A method of producing a hollow blow-molded article comprising hollow blow-molding the resin composition for hollow blow-molded article of claim 9.

\* \* \* \* \*